United States Patent Office 2,898,313
Patented Aug. 4, 1959

2,898,313

PROCESS OF DIMENSIONALLY STABILIZING CELLULOSE, COMPOSITION USED THEREFOR, AND ARTICLE PRODUCED

Walter P. Ericks, Lockport, N.Y., assignor to The Upson Company, Lockport, N.Y.

No Drawing. Application August 10, 1956
Serial No. 603,243

27 Claims. (Cl. 260—17.2)

The present invention relates to a process for the treatment of cellulose materials, to compositions employed in such a process and to the treated cellulose product. More particularly, it relates to the treatment of cellulose materials to improve their dimensional stability upon being subjected to humidity changes in the surrounding atmosphere.

In my prior Patents Reissue 24,003, Reissue 24,011, Reissue 23,866 and 2,692,183, I have shown that cellulose materials may be greatly improved as to their dimensional stability by impregnating them with a wide variety of organic compounds having a plurality of hydroxyl groups attached to different carbon atoms in the molecule. In the stabilizing compounds disclosed by patents, Reissue 23,866, Reissue 24,003 and 2,692,183, at least one of the hydroxyl groups is part of a carboxyl group. While these carboxyl group containing compounds are quite effective as stabilizing agents, certain disadvantages are encountered in the use of many of them.

Many of the carboxylic acid type stabilizers are quite acid in nature. In aqueous solutions, they often exhibit a pH of 3 or lower and, thus, are quite corrosive in nature. They will readily attack metal containers in which they are shipped and seriously damage the equipment used in the impregnation of cellulose materials with the compounds in question.

Also, many of the stabilizers which contain carboxyl groups are not sufficiently soluble in water so that it may be used as a solvent for preparing impregnating solutions. Therefore, to use them as impregnants of cellulose materials, it has often been necessary to dissolve them in a volatile organic solvent or a mixture of the solvent and water. Such solvents are all expensive and complicated procedures must be devised for their recovery for subsequent re-use. Moreover, many of the volatile organic solvents which must be used are highly inflammable and toxic in nature and create dangerous fire and health hazards.

These problems have been solved in part by the invention described in my copending application, Serial No. 426,599, filed April 29, 1954. In accordance with the teaching of this application, the acid type stabilizers are reacted at least in part with ammonia or a volatile amine so that they are rendered water soluble and their acidity in solution is greatly reduced. However, after impregnation of cellulose materials with the ammonia salts of the stabilizing compounds, the ammonia is volatilized during the drying operation and the carboxyl group regenerated.

For a number of specialized uses, it is highly desirable to control permanently the acidity of stabilized cellulose materials so that they do not become more acid in nature after impregnating and drying. It is often necessary to treat or coat the cellulose product, after stabilization, with materials which are adversely affected by highly acidic stabilizers. For instance, if the base sheet of a photographic paper is stabilized with a carboxyl group containing compound, the subsequently applied light sensitive emulsions usually inhibit light sensitivity.

As pointed out above, the use of ammonia and volatile amines for continuing control of the acidity of impregnated cellulose materials is precluded by their volatility. Other alkalis, such as sodium and potassium hydroxides and carbonates, are not suitable for controlling the pH of impregnating solutions and acidity of the impregnated cellulose product because they tend, when added in sufficient amount to produce a pH of the solution between 3 and 7, to seriously diminish the effectiveness of the stabilizer and when added in an amount to produce a pH above 7, to destroy it entirely.

In my copending application, Serial No. 541,835, I have disclosed that the problems outlined above may be effectively solved by at least partially reacting the free carboxyl group containing stabilizers with an organic basic nitrogen compound having at least one hydroxyl group attached to a carbon atom in the molecule. I have now found that similar results may be accomplished by employing another class of basic organic compounds.

Accordingly, it is the object of the present invention to provide a simple, effective and inexpensive method for dimensionally stabilizing cellulose materials against humidity variations of the atmosphere with a stabilizer which is normally quite acid in reaction but whose acidity is carefully controlled.

Another object of the invention is to provide a process which will be non-hazardous in operation.

Still another object of the invention is to provide a process which can be carried out in relatively inexpensive equipment.

A further object of the invention is to provide an impregnating composition for dimensionally stabilizing cellulose material which may be easily handled, stored for long periods of time, and transported considerable distances.

Yet another object of the invention is to provide an impregnating composition for dimensionally stabilizing cellulose material which will not deleteriously affect the cellulose article or materials with which it is subsequenty treated.

Yet another object of the invention is to provide cellulose products stabilized against expansion and contraction upon being subjected to varying humidity conditions in the atmosphere which will itself remain stable and will not affect other materials which it is contacting.

Other and further objects of the invention will be apparent from the following detailed description:

The present invention is applicable to any material having the characteristic cellulose structure, which may be expressed by the structural formula

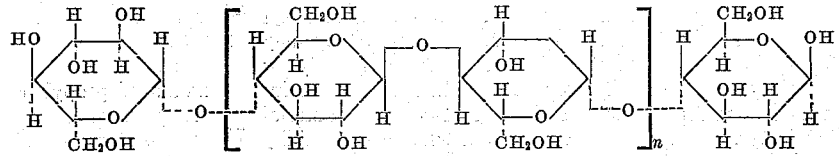

Thus, the cellulose of the material being stabilized may be in its original fibrous form or it may have been dissolved or modified in an appropriate reagent and then regenerated so long as the cellulose structure is present in the final material.

Also, it should be pointed out that the invention is not limited to any particular physical form. Such widely divergent materials as paper sheets, cardboard, structural fiber board, woven cloth of natural or regenerated cellulose fibers, wood products, whether whole or laminated, and regenerated cellulose sheets (cellophane) may be dimensionally stabilized against humidity changes by the present process and compositions. The greatest expansion and contraction due to change in relative humidity will always occur in a direction perpendicular to that at which the major portion of the cellulose molecules is oriented. In the case of wood fibers, the predominant orientation will be parallel to the axes of the fibers and in the case of regenerated cellulose sheets, it will be in the direction of the travel of the sheets through the machine on which they are formed.

The discovery which gives rise to the present invention is that the acid-type stabilizers may be at least partially reacted with basic organic compounds having at least two amino groups in the molecule and obtain a composition which itself has cellulose dimensional stabilizing properties and provides a permanent control of acidity since the original stabilizer need not be regenerated after impregnation of the cellulose material. The amino group, therefore, apparently acts in a manner similar to the hydroxyl group in its stabilizing action.

For a disclosure of the original stabilizers of an acid nature which are reacted with a polyamine in accordance with the present invention, reference is made to my previous patents, Nos. Re. 24,003, 2,692,183 and Re. 23, 866. Patent Re. 24,003 discloses the stabilization with polycarboxylic acids of cellulose materials against expansion and contraction on humidity changes in the atmosphere and names a large number of such acids which are suitable for this purpose. It will be noted that the polycarboxylic acids may be aliphatic or aromatic in nature.

In addition to the polycarboxylic acids named in Patent Re. 24,003, although clearly contemplated within its scope, are the so-called adducts, which are formed in accordance with the well-known Diels-Alder reaction whereby an unsaturated polycarboxylic acid, or its anhydride, in which ethylinic bonds are activated by the carboxyl groups, are reacted with a conjugated diene. This last-mentioned compound may itself be a carboxylic acid in which case there will be formed an acid having at least three carboxyl groups in a molecule. As examples of such adducts, may be mentioned the reaction product of eleostearic acid and maleic anhydride and the adduct formed by reacting abietic acid with maleic anhydride.

Another type of particularly suitable stabilizing compound which contains a plurality of carboxyl groups and, thus, falls within the broad class of polycarboxylic acids, although not specifically named in Patent Re. 24,003 are the polyacid esters formed by reacting an excess of a polycarboxylic acid with a polyhydric alcohol so that the hydroxyl groups of the alcohol are completely esterified, but leaving free carboxyl groups from unsatisfied portions of the polycarboxylic acid molecules. When reacting a dihydric alcohol with a dicarboxylic acid to form a diacid ester, the theoretical proportions will comprise the reaction of 2 mols of acid to 1 mol of alcohol. The resulting products will contain two free carboxyl groups in each of their molecules and, hence, they may be quite acid in nature. They may be completely or partially neutralized in accordance with the present invention and form efficient stabilizers of cellulose material against expansion and contraction due to humidity variations.

Patent 2,692,183 discloses the use of hydroxyl carboxylic acids as dimensional stabilizers for cellulose. This patent lists a large number of such acids, all of which are suitable for use in accordance with the present invention and, therefore, additional examples of this type of stabilizing compound having an acid reaction need not be further named here.

In Patent Re. 23,866 there is disclosed the dimensional stabilization of cellulose materials by impregnating them with partial esters formed by reacting aliphatic polyhydric alcohols with polycarboxylic acids in a manner fully set forth therein so that at least one free carboxyl group remains in the final molecule. When dihydric alcohols and dicarboxylic acids are employed, they will ordinarily be reacted together in substantially equimolecular proportion and the reaction carried on until approximately one-half of the hydroxyl groups of the dihydric alcohols have been reacted with half of the carboxyl groups of the dicarboxylic acids as determined by the reduction in the original acid number in the mixture to approximately one-half. When the polyhydric alcohol contains more than two hydroxyl groups, or the carboxylic acid contains more than two carboxyl groups, or when both reactants have more than two reactive groups, the same general rule holds true. There should be at least one unreacted or free hydroxyl group on the residue of the polyhydric alcohol and at least one unreacted or free carboxyl group on the residue of the polycarboxylic acid in the molecule of the resulting partial ester. It will be apparent that with polyhydric alcohols having more than two hydroxyl groups, the resulting partial ester may contain two or more hydroxyl groups on the residue of the polyhydric alcohol, and similarly, with polycarboxylic acids having more than two carboxyl groups there may be two or more carboxyl groups on the residue of the carboxylic acid. Thus, most of the partial esters are quite acid in nature and their use as dimensional stabilizers for cellulose may be restricted by this fact, as pointed out earlier. This restriction is removed, however, by the practice of the present invention whereby their acidity may be completely or materially reduced without a serious reduction in their stabilizing effect. As before, it will be unnecessary to name the partial esters in this specification since a large number are listed in my Patent Re. 23,866 and they are similarly suitable for use in the present invention.

The polyamines which may be used to control permanently the acidity of the carboxyl group containing stabilizers, mentioned above, are capable of wide variation. In the first place, the amino groups involved may be primary, secondary or sometimes tertiary and may be the same or different in a single compound. There must be at least two amino groups present but, otherwise, the number is not critical.

The polyamines may be aliphatic or aromatic in nature and it is not essential that both of the basic nitrogen atoms be, strictly speaking, amino nitrogen atoms. One of the nitrogen atoms may be that of a heterocycle and, as an example of such a compound, may be mentioned N-ethylamino morpholine. Therefore, it is to be understood that when the term "amino group" is employed in the specification and claims, it is inclusive of radicals containing a heterocyclic nitrogen atom.

As aliphatic polyamines which are suitable for use in the present invention may be mentioned ethylenediamine, diethylenetriamine, triethylenetetramine, tetraethylenepentamine, propylenediamine, hexamethylenediamine, 3-diethylaminopropylamine, a series of amines available commercially under the general name of "Duomeen" with each member of the series having a hydrogen atom attached to one of the two nitrogen atoms of propylenediamine replaced by a normal alkyl group varying in chain length from 12 to 18 carbon atoms, dipropylenetriamine, and the like.

Examples of aromatic polyamines, which may be used are: p-phenylenediamine, diaminoanisole (1,2,4), diaminobenzophenone (2,2'), diaminodiphenyl (4,4'), diaminodiphenylmethane (4,4'), diaminophenol (2,4), diaminodiphenylamine (4,4'), diaminobenzoic acid (3,5), diaminophenylacetic acid, stilbene (4,4'), triaminobenzoic acid (2,4,6), triaminotoluene (2,4,6), triaminotriphenylmethane (p,p',p''), triaminophenol (2,4,6), and the like.

Under the preferred conditions by which the polyamines are reacted with the carboxyl group containing stabilizers, salt formation is favored. This is to mix the reactants in an aqueous solution at room temperature and allow a spontaneous reaction to occur with evolution of heat which, however, should not exceed 100° C. to minimize undesirable side reactions. If sufficient heat is not supplied by the exothermic character of the reaction, outside heat may be applied to hasten the reaction.

Although, as indicated, salt formation is the primary reaction which occurs, it is entirely possible that amide formation also takes place and, in fact, it is believed that this is the case particularly when the cellulose product is heated after impregnation to rapidly dry the product. Amide formation is also encouraged when an anhydride of a polycarboxylic acid is used in place of the acid, itself. The formation of amides, however, does not materially affect the dimensional stabilizing property of the reaction product.

When the original acid stabilizing compound contains more than one free carboxyl group, as is the case with polycarboxylic acids, adducts and polyacid esters formed by reacting an excess of a polycarboxylic acid with a polyhydroxy alcohol, the resulting product is largely a monopolyamine salt of the polycarboxylic compound. This is particularly true when, as is preferred, equimolecular quantities of polyamine and polycarboxylic acid are reacted. In addition to the mono salt, however, the following materials may be present in the reaction mixture:

(1) Di-, tri-, and other polyamine salts of polycarboxylic acids.

(2) Di-, tri-, and other polycarboxylic acid salts of the polyamine.

(3) Dimer, trimer, and other polymers of monopolyamine salts of polycarboxylic acids.

(4) Amides of the reactant components.

(5) Unreacted polycarboxylic acid and unreacted polyamine.

As stated earlier, it is preferred that substantially equimolecular proportions of polyamine and acid compound be reacted but in some instances it is not necessary to neutralize completely the acid stabilizer. For different purposes it is desirable to adjust the pH to any value within the pH range of approximately 3 through 10 and it will be apparent that when only one carboxyl group is present in the acid compound, the product will have a decided basic reaction when equimolecular proportions are reacted because of the presence of at least one unreacted basic amino group in the polyamine residue.

The reaction with the polyamine will usually produce a salt which is sufficiently water soluble to permit impregnation of the cellulose materials with water solutions. In a relatively small number of cases, however, particularly when the original stabilizer is not completely neutralized, it will be necessary to dissolve the stabilizer in a mixture of water and an organic volatile hydrophilic solvent for the reaction product in question. In no instance, however, has it been found necessary to employ a solvent containing more than 50% of the organic liquid. Examples of organic solvents which may be employed in admixture with water are alcohols, such as methyl, ethyl and propyl alcohols and ketones, such as dimethyl, diethyl, methyl ethyl, methyl propyl or ethyl propyl ketones.

It will be understood, therefore, that when the expression "aqueous solution" is employed in the claims, it includes not only a solution in water alone, but a solution in water admixed with a sufficient amount of an organic volatile hydrophilic solvent to dissolve the stabilizing compound.

The cellulose material being treated may be impregnated with an aqueous solution of the neutralized or partially neutralized carboxyl group containing stabilizing agents by any suitable means, but immersion in the solution has been found the best procedure in most cases. To insure uniformity of results, it is best that the cellulose material be completely impregnated and the time necessary for complete impregnation can vary from a few seconds up to several minutes or even longer, depending on the nature and dimensions of the cellulose material and whether or not it has been previously treated with a material which will resist absorption of the impregnating solution. It is obvious, for example, that a thin paper sheet will be impregnated much faster than a fiber board sheet of several thousandths of an inch thickness. After complete impregnation, it has been found convenient to remove excess solution by running the cellulose material through the nip of a pair of pressure rolls set at a relatively light pressure.

During impregnation, the impregnating solution may be maintained at substantially any desired temperature although the usual impregnating temperatures will range between 20° C. and 50° C. However, temperatures as high as 100° C. may frequently be employed, it being borne in mind that greater quantities of the stabilizing material can be dissolved at higher temperatures.

After complete impregnation, the cellulose material is heated to dry the product. When water alone is used as the solvent for the stabilizing compound, no solvent recovery problem is presented, since it may merely be discharged into the atmosphere. While the temperature at which the cellulose material is heated during the drying operation is not critical, it should be above 100° C. to drive off water rapidly, but no practical advantage is obtained by heating above 150° C. A range of 130° to 140° C. is preferred in most instances. As explained earlier, amide formation may be promoted at these temperatures but no material decrease in the dimensional stabilization effect is brought about by this reaction. Also, when free carboxyl groups are present in the stabilizer, they may react during heating with the hydroxyl groups of either the stabilizer or cellulose forming esters, but again this will not destroy the dimensional stabilization of the cellulose product against humidity changes.

The concentration of the impregnating solution will be determined by the amount of stabilizer to be introduced into the cellulose material being treated. While the stabilizing effect is dependent upon the quantity of the stabilizing compound incorporated in the cellulose material being treated, this quantity can vary widely. The exact quantity to be incorporated will be determined by the type of material, the nature of the stabilizing compound and the amount of the usual expansion or contraction upon subjection to varying humidity conditions which it is desired to remove. Under certain conditions of use, the removal of as little as 12% or 15% of the normal expansion or contraction of a cellulose article may be all that is necessary, whereas under other conditions of use, it may be desirable to remove 50%, 60% or 70%, or more, of the normal expansion or contraction. In most instances, at least 2% of the neutralized or partially neutralized carboxyl group containing stabilizing compound of the present invention is required to bring about any appreciable dimensional stabilization of a cellulose material and there is seldom any reason to incorporate more than 50% of stabilizing material into the cellulose article based on the dry weight of the article. In general, a range of 10 to 40% is preferred.

Having determined the amount of the stabilizer, which is to be incorporated, it is a simple matter to determine what should be the proper concentration of the impregnating solution. By simple tests, the amount of solution which will be absorbed on complete impregnation may be determined, and the concentration of the solution is adjusted accordingly. Most fibrous cellulose materials, such as paper and fiber board sheets, will absorb something over their dry weight of impregnating solution when the same is an aqueous medium.

The proper concentration of the stabilizing solution may be effected by adding the proper amounts of polyamine and original acid stabilizing compound to the reaction mixture and, in this case, the reaction mixture may be employed directly as the cellulose impregnating solution. On the other hand, the reactants may be added in amounts which will provide a more concentrated solution than needed and the reaction mixture may then be diluted as desired for use as the impregnating solution.

As disclosed in my earlier patents and applications, the fixation of the stabilizing compounds in the cellulose material may be enhanced by employing them in combination with thermosetting resins, although the inclusion of such resins is not an essential feature of the invention. If employed, it is preferred that the thermosetting resin in an early stage of its condensation be included in the impregnating solution which includes the stabilizer and, therefore, a resin which is soluble or at least readily dispersible in water at such a stage should be selected. A urea-formaldehyde type resin has been found very suitable for use in the present process and water soluble forms are readily available on the open market. One such resin is known to the trade as Urac 180.

Another water soluble thermosetting resin which may be used to advantage is that formed by the condensation of melamine with formaldehyde and again such a resin is available on the open market. One particular form of this resin, known to the trade as Melmac 405, is particularly suitable at pH range of 6.5 to 9.5, while the other form of melamine-formaldehyde resin, known to the trade as Parez 607, is particularly well suited when the pH of an aqueous solution is below 4.5.

Several forms of water soluble phenol-formaldehyde resins are also readily available and this form of resin is also very suitable for use with the stabilizer compositions of the present invention.

The amount of thermosetting resin to be incorporated in the cellulose product may be varied widely depending on the nature of the product and the use for which it is intended. The larger the amount of thermosetting resin present, the greater will be the wet strength and water resistance of the product, but, on the other hand, its flexibility will be adversely affected although it may be stated that the stabilizers of this invention have a pronounced plasticizing effect on the thermosetting resin. In general, the amount of thermosetting resin present in the final product based on its dry weight will be between 5 and 50% and again, it is a simple matter to determine the resin concentration in the impregnating solution, which will assure that the desired amount of the resin is taken up by the cellulose material.

Another aspect of the present invention, which, however, is not to be considered an essential feature, is the incorporation in the impregnating solution of various water-proofing and sizing agents in emulsion or dissolved form which do materially affect the flexibility of the cellulose product. An emulsion of microcrystalline paraffin wax, which may contain 50% solids, has been found particularly suitable for producing a water repellent product. The wax is kept in suspension by an emulsifying agent, which may preferably be of the nonionic type, such as nonaethylene glycol laurate.

Latexes of natural or artificial rubbers also serve as effective water-proofing agents.

In the use of impregnating solutions containing water-proofing agents dispersed therein in emulsion form, the solutions of the stabilizers appear to readily and swiftly penetrate to the interior of the cellulose material being treated, whereas the water-proofing agents collect on the surface and are affixed thereon by the subsequent heating step. The final products have a greatly increased resistance to water, absorbing far less than is the case with untreated products.

The amount of water-proofing agent employed is not particularly critical, but usually will be in an amount sufficient to deposit on the final product about 1% to 5% of the agent based on the dry weight of the product.

Other treating agents may advantageously be included in the cellulose impregnating solutions of this invention. For example, for certain purposes, it has been found desirable to include a proteinaceous size, such as glue or gelatin, in a soluble or water dispersible form. The amount of size included will depend upon the intended use of the cellulose product, but will usually be enough to incorporate in or on the cellulose material 2% to 15% of the proteinaceous size based on the dry weight of the material.

The following examples illustrate the dimensional stabilization of cellulose materials with various carboxyl group-containing stabilizers reacted with a number of polyamines.

*Example 1*

An aqueous solution was prepared by dissolving 60.1 parts (1 mol) of ethylenediamine and 146.2 parts (1 mol) of adipic acid in 481.0 parts of water. The resulting clear solution had a pH value of 6.4 after the spontaneous evolution of heat had subsided. A 30% and 15% solution of the product of this example was used to impregnate unsized cellulose fiber board manufactured from newsprint stock on a cylinder machine. The dried strips containing 35.3% and 21.5% of the salt of this example lost 68.8% and 38.2%, respectively, of their normal hygroexpansivity when exposed to relative humidity changes of 0% to 90%.

*Example 2*

An aqueous solution of diethylenetriamine salt of adipic acid was prepared by dissolving equimolecular quantities of diethylenetriamine and adipic acid in water. A clear solution having a pH value of 8.3 resulted after the exothermic reaction accompanying the salt formation had subsided. Unsized cellulose fiber board strips manufactured from newsprint stock on a cylinder machine were impregnated with solutions containing 30% and 15% of the salt of this example. The dried strips containing 35.1% and 24.4% of this salt lost 66.0% and 35.9%, respectively, of their usual tendency to expand and contract when exposed to atmospheric changes in varying humidity.

*Example 3*

Equimolecular quantities of triethylenetetramine and adipic acid were dissolved in water. A clear solution having a pH value of 9.6 resulted after the exothermic reaction accompanying salt formation had subsided. Solutions containing 30% and 15% of the salt of this example were used to impregnate unsized cellulose fiber board strips manufactured from newsprint stock on a cylinder machine. The dried strips containing 40.1% and 26.4% of the salt lost 78.4% and 38.9%, respectively, of their normal tendency to expand and contract when exposed to atmospheric changes of varying humidity.

*Example 4*

Equimolecular quantities of tetraethylenepentamine and adipic acid were dissolved in water. A clear solution having a pH value of 9.1 resulted after the exothermic reaction accompanying salt formation had subsided. A 30% salt solution and one diluted to 15% concentration were used to impregnate unsized cellulose fiber board strips manufactured from newsprint stock on a cylinder machine. The dried strips containing 40.6% and 25.1% of this salt lost 78.4% and 23.6%, respectively, of their normal hygroexpansivity when exposed to atmospheric changes of varying humidity.

Example 5

Equimolecular quantities of propylenediamine and adipic acid were dissolved in water. A clear solution having a pH value of 6.5 resulted after the exothermic reaction accompanying salt formation had subsided. A 30% salt solution and solutions diluted to 15% and 7.5% concentrations were used to impregnate unsized cellulose fiber board strips manufactured from newsprint stock on a cylinder machine. The dried strips containing the salt of this example in quantities varying from 13.2% to 39.0%, based on the dried impregnated board, showed substantial improvements in dimensional stability.

Example 6

Unsized cellulose fiber board strips cut 12" in the direction across the grain, 2" in the direction with the grain, and 0.060" thick, were impregnated with a 25% aqueous solution of hexamethylenediamine salt of adipic acid, which was prepared by dissolving 155.5 parts (1.0 mol) of 75% aqueous hexamethylenediamine and 146.1 parts (1 mol) of adipic acid in 748.4 parts of water. The clear yellow solution having a pH value of 10.0 was diluted with water and the diluted solutions containing 12.5% and 6.25% of the salt were also used in impregnation of strips of this example. The dried impregnated strips containing the salt in quantities ranging from 12.5% to 35.7% showed improvements in dimensional stability when exposed to the atmosphere of varying relative humidity.

Example 7

A 25% aqueous solution of the ethylenediamine salt of oxalic acid was prepared by dissolving equimolecular quantities of ethylenediamine and oxalic acid in water. A clear solution having a pH value of 8.4 resulted after the exothermic reaction accompanying salt formation had subsided. This solution and solutions diluted with water to concentrations of 12.5% and 6.25% were used to impregnate unsized cellulose fiber board strips manufactured from newsprint stock on a cylinder machine. The dried strips containing the salt in quantities varying from 18.5% to 29.9% showed improvement in dimensional stability under varying conditions of humidity in the atmosphere.

Example 8

A 25% aqueous solution of the ethylenediamine salt of malonic acid was prepared by dissolving equimolecular quantities of malonic acid and ethylenediamine. A clear solution having a pH value of 8.7 resulted after the exothermic reaction accompanying salt formation had subsided. This solution and a solution diluted with water to 12.5% concentration were used to impregnate unsized cellulose fiber board strips manufactured from newsprint stock on a cylinder machine. The dried strips containing 32.0% and 29.8% of this salt lost 50.4% and 44.0%, respectively, of their normal hygroexpansivity when exposed to changes of relative humidity from 0 to 90% in the atmosphere.

Example 9

A 25% aqueous solution tetraethylenepentamine salt of succinic acid was prepared by dissolving equimolecular quantities of succinic acid and tetraethylenepentamine in the required amount of water. A clear solution having a pH value of 8.8 resulted when the moderately exothermic reaction indicating salt formation had subsided. This solution and a solution diluted with water to 12.5% concentration of solids were used to impregnate unsized cellulose fiber board strips manufactured from newsprint stock on a cylinder machine. The dried strips containing the salt in quantities varying from 20.2% to 32.0% showed improvement in dimensional stability when the strips were wetted with water, or when they were exposed to variation of humidity in the atmosphere.

Example 10

Unsized cellulose fiber board strips, manufactured from newsprint stock on a cylinder machine, were impregnated with an aqueous solution made by dissolving 116.1 parts (1.0 mol) of fumaric acid and 149.7 parts (1.1 mols) of triethylenetetramine in 645.0 parts of water. A clear pale yellow solution having a pH value of 8.3 resulted when the exothermic reaction had subsided. The dried impregnated strips containing 36.5% of the salt of this example, based on the weight of the impregnated strip, lost 53.4% of their normal hygroexpansivity when exposed to changes in relative humidity of the atmosphere ranging from 0 to 90%.

Example 11

Sized cellulose fiber strips made from 50% sulfite fibers and 50% jute fibers on a cylinder machine and cut 12" in the direction across the predominating direction of fibers and 2" parallel to the predominating direction of the fibers were impregnated with a 25% aqueous solution of para-phenylenediamine salt of azelaic acid, which was prepared by dissolving 97.0 parts (0.5 mol) of azelaic acid and 54.0 parts (0.5 mol) of paraphenylenediamine in 604.9 parts of water. The clear solution having a pH value of 8.1 was subsequently diluted with water to form solutions of 12.5% and 6.25% concentrations which were used for impregnation of cellulose fiber strips. The dried impregnated strips containing 14.5% to 30.8% of the salt of this example showed improvement in dimensional stability when exposed to atmosphere of varying humidity, or when wetted with water.

Example 12

A 25% aqueous solution of the ethylenediamine salt of dihydroxystearic acid was prepared by dissolving 18.9 parts (0.33 mol) of ethylenediamine and adding 104.5 parts (0.33 mol) of dihydroxystearic acid slowly and with constant stirring. A clear amber colored solution having a pH value of 8.35 resulted when the acid completely dissolved. This solution and a solution diluted with water to concentration of 12.5% were used to impregnate slack sized cellulose fiber board strips. The dried strips containing 29.0% and 18.4% of this salt, based on the weight of the impregnated board, lost 58.0% and 43.8%, respectively, of their normal hygroexpansivity when exposed to humidity changes in the atmosphere from 0 to 90%.

Example 13

A 25% aqueous solution of the ethylenediamine salt of polyhydroxystearic acid, manufactured and sold by the Baker Castor Oil Co., was prepared by dissolving 30.6 parts (0.5 mol) of ethylenediamine in 588.9 parts of water and adding 165.5 parts of polyhydroxystearic acid slowly and with constant stirring. A clear red colored solution having a pH value of 8.5 resulted when the acid completely dissolved. This solution was used to impregnate slack sized cellulose fiber board strips. The dried strips containing 19.5% of this salt, based on the weight of the impregnated board, lost 50% of their normal hygroexpansivity when exposed to humidity changes in the atmosphere ranging from 0 to 90%. The polyhydroxystearic acid of this example has a melting point of 60–64° C., an acid value of 170, an iodine value of 4, a saponification value of 181, and contains on the average 2.7 hydroxyl groups per mole of polyhydroxystearic acid.

Example 14

111.0 parts (0.75 mol) of phthalic anhydride was added to 679.3 parts of boiling water and the mixture was stirred and heated until the anhydride was converted into phthalic acid. The mixture was cooled and after the addition of 97.7 parts (0.75 mol) of N-ethylaminomorpholine and stirring a clear solution of the salt was formed having a pH value of 5.05. The 25.0%, 12.5% and 6.25% solutions of the salt of this example were used in impregnating unsized cellulose fiber board strips cut 12″ long perpendicular to the predominating direction of fibers and 2″ wide parallel to the predominating direction of fibers. The dried impregnated strips containing 34.8%, 20.3% and 11.0% of the salt of the example, based on the weight of the impregnated strips, lost 52.0%, 34.2% and 18.0%, respectively, of their normal hygroexpansivity when exposed to variations of relative humidity in the atmosphere ranging from 0 to 90%.

*Example 15*

The phthalic acid salt of 3-diethylaminopropylamine was prepared by adding 111.0 parts (0.75 mol) of phthalic anhydride to 679.5 parts of boiling water, heating the solution until a precipitate formed indicating acid formation, cooling the mixture and adding 97.5 parts (0.75 mol) of 3-diethylaminopropylamine. Clear solutions containing 21.7% and 10.9% of the salt of this example dissolved in ethyl alcohol-water mixture were used for impregnation of cellulose fiber board. Impregnated strips containing 6.9% and 29.4% of the salt of this example showed improvement in dimensional stability when exposed to atmospheres of varying humidity.

*Example 16*

A 25% aqueous solution of the triethylenetetramine salt of pyromellitic acid was prepared by dissolving 127.1 parts (0.5 mol) of pyromellitic acid and 109.7 parts (0.75 mol) of triethylenetetramine in 710.0 parts of water. A clear solution having a pH value of 7.7 resulted when the spontaneous evolution of heat normally accompanying salt formation had subsided. This solution and solutions diluted with water to concentrations of 12.5% and 6.25% were used to impregnate unsized fiber board strips manufactured from newsprint stock on a cylinder machine. The dried impregnated strips containing amounts of this salt ranging from 14.9% to 35.9%, based on the impregnated weight, showed improvement in dimensional stability when exposed to relative humidity changes in the atmosphere.

*Example 17*

A solution was prepared by dissolving 69.1 parts (0.5 mol) of ortho-salicyclic acid and 90.0 parts of an amine, sold under the trade name of Duomeen C, in a mixture composed of 264.0 parts of water and 131.9 parts of 91% isopropanol. The ensuing solution containing 25% solids and having a pH value of 7.65, and also more diluted solutions containing 12.5% and 6.25% of the salt of this example were used in the impregnation of unsized fiber board strips. The dried impregnated strips containing 38.1%, 22.8% and 13.4% of the salt of this example lost 81.0%, 60.2% and 43.5%, respectively, of their original tendency to expand and contract when exposed to changes in the relative humidity of the atmosphere ranging from 0 to 90%.

Duomeen C is one of the series of propylenediamines wherein a hydrogen atom attached to one of the two nitrogen atoms in the molecule is replaced by a normal alkyl group varying in chain length from 12 to 18 carbon atoms.

*Example 18*

Unsized cellulose fiber board strips manufactured from newsprint stock on a cylinder machine were impregnated with a solution made by dissolving 167.0 parts (0.5 mol) of ethylene glycol azelaic acid monoester and 75.1 parts of commercially available Duomeen S in 344.0 parts of water and 171.8 parts of 91% isopropanol. The remaining clear solution containing 31.8% salt of this example and having a pH value of 6.0 was diluted with water to concentrations of 12.5% and 6.25% solids. These solutions were used also for impregnation of cellulose fiber board strips. Dried strips containing 37.6%, 23.7% and 21.0% of the salt of this example lost 84.3%, 60.4% and 48.9%, respectively, of their tendency to expand and contract when exposed to relative humidity variations ranging from 0 to 90%.

Duomeen S is one of the series of propylenediamines wherein a hydrogen atom attached to one of the two nitrogen atoms in the molecule is replaced by a normal alkyl group varying in chain length from 12 to 18 carbon atoms.

*Example 19*

A 25% aqueous solution of the ethylenediamine salt of 2-butyne-1,4-diol phthalic acid monoester was prepared by dissolving 117.6 parts (0.5 mol) of 2-butyne-1,4-diol phthalic acid monoester and 30.6 parts (0.5 mol) of ethylenediamine in 441.8 parts of water. The resulting brown solution had a pH value of 7.95. Unsized fiber board strips were impregnated with this and more diluted solution. The dried impregnated strips containing 17.2% to 30.0% of the salt of this example showed improvement in dimensional stability when exposed to variations of relative humidity ranging from 0 to 90%.

*Example 20*

A solution containing 30% solids was prepared by dissolving 219.3 parts (0.5 mol) of 2-ethylhexanediol diadipate and 56.8 parts (0.55 mol) of diethylenetriamine in 644.2 parts of water. The resulting clear brown colored solution having a pH value of 8.8 and its more dilute solutions containing 15% and 7.5% of the salt of this example were used in impregnation of unsized cellulose fiber board strips. Dried impregnated strips containing the salt of this example in amounts ranging from 9.7% to 28.4%, based on the weight of the impregnated strips, showed improvement in dimensional stability when exposed to variations of relative humidity in the atmosphere.

*Example 21*

Unsized cellulose fiber board strips were impregnated with a solution prepared by dissolving 249.3 parts (0.75 mol) of propylene glycol diadipate and 85.1 parts (0.825 mol) of diethylenetriamine in 780.3 parts of water. The 25% solids solution having a pH value of 8.8 was subsequently diluted with water to obtain solutions of 12.5% and 6.25% solids concentrations. Dried impregnated cellulose fiber strips containing 13.3% to 39.4% of the salt of this example showed improvement in dimensional stability when exposed to relative humidity variations in the atmosphere ranging from 0 to 90%, or when they were wetted with water.

*Example 22*

Cellulose fiber strips made from 100% rag paper were impregnated with aqueous solutions containing 30% and 15% solids of the following composition: 70% of the diethylenetriamine salt of dihydroxystearic acid and 30% of a melamine-formaldehyde resin. The original 30% solution was prepared by dissolving 20.6 parts (0.2 mol) of diethylenetriamine and 63.3 parts (0.2 mol) of dihydroxystearic acid in 279.8 parts of water and adding 36.0 parts of a melamine-formaldehyde resin. The 30% solution having a pH value of 9.3 was subsequently diluted with water to 15% solids concentration. Dried impregnated strips containing 30.9% and 20.6% of these solids lost 53.0% and 39.5% of their normal hygroexpansivity when subjected to atmospheres of varying relative humidity.

*Example 23*

A solution was prepared by dissolving 11.1 parts (0.15 mol) of propylenediamine and 60.3 parts (0.15 mol) of diethylene glycol diphthalate in 238.0 parts of water.

62.2 parts of 49.2% aqueous solution of a urea-formaldehyde resin was then stirred into the solution. The final solution had a pH value of 5.3. Dried impregnated strips of slack sized 100% sulfite paper containing 28.8% and 34.4% of the solids described in this example showed improvement in dimensional stability when exposed to varying relative humidity in the atmosphere, or when wetted with water.

*Example 24*

A solution was prepared by dissolving 26.0 parts (0.2 mol) of itaconic acid and 64.4 parts of Duomeen S in 256.0 parts of water. 76.6 parts of a 12% aqueous dispersion of animal glue and 18.3 parts of a 50% aqueous emulsion of petroleum wax were then stirred into the solution. The pH of this solution was 6.4. Dried impregnated cellulose fiber strips of 100% sulfite paper containing 4.6% to 18.0% of solids described in this example showed improvement in dimensional stability when exposed to variation of relative humidity in the atmosphere.

*Example 25*

A solution was prepared by dissolving 11.1 parts (0.15 mol) of propylenediamine and 65.0 parts (0.15 mol) of the diazelaic acid ester of glycerol in 253.5 parts of water and adding 8.4 parts of a melamine-formaldehyde resin. The pH value of the 25% solution was 6.95. Dried impregnated cellulose fiber strips containing 16.9% of the solids of this example lost 54% of their normal hygroexpansivity when exposed to variations of relative humidity in the atmosphere, and they showed improved dimensional stability when wetted with water.

*Example 26*

Unsized cellulose fiber board strips were impregnated with an aqueous solution prepared by dissolving 75.0 parts (0.575 mol) of N-aminoethylmorpholine and 2.6 parts (0.8 mol) of glycerol azelaic acid monoester in 729.4 parts of water and adding 63.0 parts of a 49.2% aqueous solution of a urea-formaldehyde resin. The solution containing 30% solids and having a pH value of 6.3 was subsequently diluted with water and used in impregnation of cellulose fiber board strips at 15% concentration. Dried impregnated strips containing 36.6% and 24.5% of the solids of this example lost 64.9% and 28.5%, respectively, of their normal hygroexpansivity when exposed to variations of relative humidity in the atmosphere.

*Example 27*

Unsized cellulose fiber board strips were impregnated with an aqueous solution prepared by dissolving 94.1 parts (0.5 mol) of azelaic acid and 63.3 parts (0.55 mol) of diethylaminopropylamine in 408.1 parts of water and adding 17.5 parts of melamine-formaldehyde resin. This solution containing 25% solids and having a pH value of 8.6 was subsequently diluted with water to contain 12.5% solids, and was used for impregnation of cellulose fiber board strips. Dried impregnated strips containing 32.3% and 23.3% of the solids of this example lost 55.5% and 16.6%, respectively, of their normal expansion and contraction when exposed to atmosphere variations of relative humidity ranging from 0 to 90%.

*Example 28*

Unsized cellulose fiber board strips were impregnated with an aqueous solution prepared by dissolving 65.0 parts (0.5 mol) of N-aminoethylmorpholine and 216.3 parts (0.8 mol) of glycerol azelaic acid monoester in 562.6 parts of water. 293.0 parts of a 12% aqueous dispersion of animal glue and 70.3 parts of a 50% aqueous emulsion of petroleum wax were then added to this solution. This mixture containing 29.1% solids had a pH of 6.3 and was subsequently diluted with water to permit impregnation at 15% solids concentration. Dried impregnated strips containing 30.6% and 16.2% of the solids of this example lost 56.0% and 37.4%, respectively, of their normal hygroexpansivity when exposed to variations of relative humidity in the atmosphere, and they showed improved dimensional stability when wetted with water.

*Example 29*

Unsized cellulose fiber board strips were impregnated with an aqueous solution prepared by dissolving 154.9 parts (1.0 mol) of 75% aqueous hexamethylenediamine and 130.1 parts (1.0 mol) of itaconic acid in 499.5 parts of water, and adding 43.5 parts of a melamine-formaldehyde resin. This solution contained 35% solids and had a pH of 6.9. It was subsequently diluted with water to contain 17.5% and 8.8% solids and was used in impregnations of cellulose fiber board strips. The dried impregnated strips containing 40%, 23.7% and 14.1% of the solids of this example lost 58.4%, 35.7% and 17.5%, respectively, of their normal hygroexpansivity when exposed to atmosphere variations in relative humidity ranging from 0 to 90%.

*Example 30*

A solution was prepared by dissolving 51.6 parts (0.5 mol) of diethylenetriamine and 107.5 parts (0.25 mol) of hexanetriol-1,2,6 diphthalate in 371.2 parts of water. 74.0 parts of a 10% aqueous dispersion of gelatin and 29.6 parts of a 50% aqueous wax emulsion were then added. The dispersion had a pH value of 9.1 and contained 29% solids. It was used in impregnation of cellulose fiber strips, and was subsequently diluted with water to permit impregnations at concentrations of 14.5% and 7.25%. Dried impregnated cellulose fiber board strips containing 36.2%, 23.6% and 14.5% of these solids lost 52.1%, 31.1% and 21.8%, respectively, of their normal hygroexpansivity when exposed to changes of relative humidity in the atmosphere.

*Example 31*

Cellulose fiber board strips were impregnated with aqueous solutions containing 30, 15 and 7.5% of the tetraethylenepentamine salt of salicylic acid. The 30% solution was prepared by dissolving 94.7 parts (0.5 mol) of tetraethylenepentamine and 69.1 parts (0.5 mol) of salicylic acid in 449.4 parts of water and adding 28.9 parts of a melamine-formaldehyde resin. The resulting solution had a pH value of 9.5. Dried impregnated strips containing 41.2%, 24.5% and 14.4% of the solids of this example lost 64.2%, 32.1% and 24.6%, respectively, of their normal hygroexpansivity when exposed to changes of relative humidity in the atmosphere.

*Example 32*

Cellulose fiber board strips made from newsprint stock on a cylinder machine were impregnated with a 30%, 15% and 7.5% aqueous dispersion of the solids of the following composition: 90% salt of phthalic acid and hexamethylenediamine, 5% emulsified wax and 5% gelatin. The 30% dispersion was prepared by hydrolizing 111.1 parts (0.75 mol) of phthalic anhydride in 159.0 parts of water and adding 116.2 parts (0.75 mol) of 75% aqueous hexamethylenediamine. A dispersion of 15.7 parts of gelatin in 337.3 parts of water, and 31.4 parts of a 50% aqueous emulsion of petroleum wax were added to this solution, which had a final pH value of 8.4. Dried impregnated strips containing the solids of this example in amounts ranging from 14.1% to 38.7% showed improvement in dimensional stability when exposed to changes of relative humidity in the atmosphere.

*Example 33*

Cellulose fiber board strips made from newsprint stock on a cylinder machine were impregnated with an aqueous solution prepared by hydrolizing 74.0 parts (0.5 mol)

of phthalic anhydride in 460.7 parts of boiling water. 94.7 parts (0.5 mol) of tetraethylenepentamine was then added to the acid slurry. The solution was cooled and 19.8 parts of a melamine-formaldehyde resin was added. The resulting clear solution had a pH value of 8.65. Dried impregnated strips containing 40.0% and 39.8% of the solids of this example lost 65.8% and 64.0% respectively, of their normal expansion and contraction when exposed to variations of relative humidity in the atmosphere.

*Example 34*

Cellulose fiber board strips made from newsprint stock on a cylinder machine were impregnated with a solution prepared by dissolving 25.8 parts (0.25 mol) of diethylenetriamine and 137.0 parts (0.25 mol) of polyethylene glycol 400 phthalic acid monoester in 506.0 parts of water, and adding 54.3 parts of a melamine-formaldehyde resin. The resulting solution had a pH value of 9.3. This solution was further diluted to permit impregnations at concentrations of 15% and 7.5%. Dried impregnated strips containing 37.2%, 22.8% and 11.8% of the salt of this example lost 73.3%, 24.7% and 19.9%, respectively, of their normal hygroexpansivity when exposed to changes of relative humidity in the atmosphere.

*Example 35*

Cellulose fiber strips made from 100% sulfite paper were impregnated with a solution prepared by dissolving 26.0 parts (0.2 mol) of N-aminoethylmorpholine and 66.7 parts (0.2 mol) of polyhydroxystearic acid in 150 parts of water. 15.4 parts of animal glue dispersed in 99.1 parts of water and 11.0 parts of a 50% aqueous wax emulsion were stirred into this solution, which had a final pH value of 8.0. Dried impregnated strips containing solids of this example ranging from 16.4% to 24.0% showed improvement in dimensional stability when exposed to changes of relative humidity of 0 to 90%.

*Example 36*

Cellulose fiber board strips were impregnated with an aqueous solution prepared by dissolving 51.6 parts (0.5 mol) of diethylenetriamine and 76.0 parts (0.5 mol) of β-resorcylic acid in 222.3 parts of water. 206 parts of a 10% aqueous dispersion of animal glue and 22.7 parts of a 50% aqueous wax emulsion were added to this solution. This solution having a pH value of 9.2 was subsequently diluted to permit impregnation with solutions containing 15% and 7.5% solids. Dried impregnated strips containing solids of this example in amounts ranging from 19.5% to 37.5% showed improvement in dimensional stability when exposed to relative humidity changes in the atmosphere.

*Example 37*

Cellulose fiber board strips were impregnated with an aqueous solution prepared by dissolving 25.6 parts (0.244 mol) of diethylenetriamine and 138.0 parts (0.244 mol) of polyethylene glycol 300 phthalic acid monoester in 314.8 parts of water. 9.1 parts of animal glue suspended in 100 parts of water and 18.2 parts of a 50% aqueous emulsified wax were added to this solution of pH value of 9.8. This solution was subsequently diluted with water to also permit impregnations at lower concentrations of 15% and 7.5% solids. Dried impregnated strips containing 39.2%, 22.7% and 12.6% of this example lost 72.5%, 28.9% and 20.0%, respectively, of their normal hygroexpansivity when exposed to changes of relative humidity in the atmosphere.

*Example 38*

Aqueous solutions containing 30%, 15% and 7.5% of solids of the following composition were prepared: 80% of mono-3,3'-iminobispropylamine salt of monopropylene glycol dicitrate, 10% animal glue and 10% emulsified wax. The 30% solution having a pH value of 4.8 and more dilute solutions containing 15% and 7.5% of solids were used in impregnation of cellulose fiber board strips. Dried impregnated strips containing 33.6%, 17.8% and 15.4% of these solids lost 66.8%, 30.0% and 21.8%, respectively, of their normal expansion and contraction when exposed to changes of relative humidity in the atmosphere.

*Example 39*

A solution was prepared by dissolving 118 parts (1.0 mol) of succinic acid and 60.1 parts (1.0 mol) of ethylenediamine in 417 parts of water. When the exothermic reaction, indicating salt formation, had subsided the resulting clear solution had a pH of 6.2. 30% and 15% solutions were impregnated into unsized cellulose fiber board strips manufactured on a cylinder machine. The dried impregnated strips containing 44% and 29% of the salt of this example lost 52% and 44%, respectively, of their normal hygroexpansivity when exposed to variation in relative humidity in the atmosphere from 0 to 90%.

To a 30% aqueous solution containing 198.1 parts (1.0 mol) of the salt of this example was added to 60 parts (1.0 mol) of glacial acetic acid. The pH of this solution was 5.2. Cellulose fiber board strips impregnated with 30, 15 and 7.5% solutions of the salt of this example contained after drying 48, 28, 16 and 9% of the salt, and showed a loss of 76, 42, 10 and 6%, repectively, of their normal hygroexpansivity.

*Example 40*

An aqueous solution was prepared by dissolving 116.1 parts (1.0 mol) of maleic acid and 60.1 parts (1.0 mol) of ethylenediamine in 412 parts of water. After the exothermic reaction, indicating salt formation, had subsided, a clear solution formed which had a pH of 7.2. Cellulose fiber board strips impregnated with 30, 15, 7.5 and 3.8% solutions of the salt of this example after drying contained 46, 34, 25 and 17% of the salt and lost 63, 58, 36 and 14%, respectively, of their normal hygroexpansivity when exposed to a relative humidity variation from 0 to 90% in the atmosphere.

In the above examples when fiber board is mentioned, it will be understood that this terminology is employed to designate a single ply sheet having a thickness usually between .030 and .065 inch and formed of cellulose pulp fiber either on a cylinder or Fourdrinier machine.

Thus, I have disclosed an economical and safe process for dimensionally stabilizing cellulose materials, novel cellulose products stabilized thereby and novel compositions of matter for use in the process. As shown by examples, cellulose materials are dimensionally stabilized by the present compositions whether the material is subjected to varying humidity in the atmosphere or whether it is actually wet with water. Cellulose sheet materials which after being wet with water would ordinarily cup and curl, show little tendency in this direction if they have previously been treated with my dimensional stabilizers.

Photographic prints and papers are a type of article in which this cupping and curling is particularly pronounced either when wet with water or subjected to humidity variations in the atmosphere. This is believed due to the fact that there is a differential in the rate and the degree of drying between the side of the paper that is emulsion coated and that which is uncoated. It has already been pointed out that the stabilizers of the present invention are particularly suitable for use with photographic papers since they are readily adjusted to an acidity which will not affect the light sensitive emulsion coating.

The anti-curling effect of the present stabilizers may be realized with respect to photographic papers either by treating the base paper sheet before the light sensitive emulsion is applied or by treating the photographic print itself after it has been fully developed and washed. With respect to the last procedure, it is not necessary to dry the print before immersing it in a solution containing the stabilizing agent, as even when wet, a thorough impregnation of the cellulose base occurs.

In the treatment of photographic papers, by impregnating the base sheet prior to emulsion coating, only saturated stabilizing compounds should be employed, since it has been found that unsaturated compounds will radically alter the speed of the light sensitive emulsion. In fact, the polyamine reaction products of the present invention have a tendency to increase the speed of the light sensitive emulsion. However, this can be compensated for in the emulsion, itself, or, preferably, a thin barrier layer may be placed between the base paper and the photographic emulsion. This barrier may be of any suitable material which will prevent the stabilizer in the base sheet from contacting and affecting the subsequently applied photographic emulsion. Gelatin, animal glue, starch, casein, shellac, acrylic resins, polyvinyl acetate resins may be mentioned as forming suitable barrier films.

It is obvious that the use of a barrier layer may be extended to other coated sheet materials in which it is desirable to have the base sheet dimensionally stabilized with a stabilizer which would adversely affect the coating material applied thereto. For example, some printing inks and dyes will exhibit color change on being contacted with certain of my stabilizing compounds.

Of course, when a completely developed print is being treated, all of the considerations having to do with an adverse action on the photographic emulsion can be ignored. Fully developed prints which have been thoroughly washed to remove the hypo are then drained to remove excess water and immersed in a flattening solution comprising the present stabilizer compounds dissolved in water.

The prints are then drained again to remove the excess solution and transferred face down on a clean ferrotype plate for drying.

The prints so treated are very resistant to curling or cupping on being subjected to varying moisture conditions and are soft and pliable and exhibit resistance to cracking when bent or folded. The flattener imparts a smooth deep gloss to the prints which is distinctly superior to the surface shine of untreated prints.

It is desirable, however, to treat the base sheet prior to coating with the light sensitive emulsion because great difficulty is experienced during the final drying operation in the manufacture of photographic papers. Unless great care is employed and expensive equipment used, the prints will curl very badly, sometimes even to the extent of cracking the emulsion coating. This curling is largely prevented if the base sheet has been previously treated with a dimensional stabilizer of the present invention.

Again, with respect to the treating of cellulose products in general, it has been found that the treating compounds impart desirable qualities other than dimensional stabilization to the treated products. For instance, the resistance of the treated article to abrasion is markedly increased. This is particularly important when such products as tabulating cards and playing cards are being treated.

Another important property of the stabilizing compounds is that cellulose materials impregnated therewith will not develop a static electrical charge. At the same time, the stabilizers provide an impregnated cellulose product having improved qualities of softness and flexibility.

Although not so important with respect to the finished article, it should be mentioned that the present stabilizers have pronounced anti-foaming characteristics when in solution. As a result, many auxiliary treating agents which would ordinarily cause objectionable foaming may be included in the impregnating solution. Examples of such agents are the protein compounds, glue and gelatin, mentioned earlier in the specification.

I claim:

1. The process of dimensionally stabilizing cellulose subject to varying humidity conditions comprising impregnating said cellulose with an aqueous solution of the salt of a polyamine free of hydroxyl groups and an organic compound having a plurality of hydroxyl groups attached to different carbon atoms in the molecule, at least one of the hydroxyl groups being part of a carboxyl group, said organic compound being selected from the group consisting of a polycarboxylic acid, a hydroxy monocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid; and drying said impregnated cellulose, said cellulose being impregnated with a sufficient amount of said solution that the dried impregnated cellulose contains from about 2–50% by weight of said salt.

2. The process of claim 1 wherein said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

3. The process of dimensionally stabilizing cellulose subject to varying humidity conditions comprising impregnating said cellulose with an aqueous solution of a salt of a polyamine free of hydroxyl groups and a polycarboxylic acid and drying said impregnated cellulose, said cellulose being impregnated with a sufficient amount of said solution that the dried impregnated cellulose contains from about 2–50% by weight of said salt.

4. The process of claim 3 in which said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

5. The process of dimensionally stabilizing cellulose subject to varying humidity conditions comprising impregnating said cellulose with an aqueous solution of a salt of a polyamine free of hydroxyl groups and a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid, and drying said impregnated cellulose, said cellulose being impregnated with a sufficient amount of said solution that the dried impregnated cellulose contains from about 2–50% by weight of said salt.

6. The process of claim 5 in which said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

7. The process of dimensionally stabilizing cellulose subject to varying humidity conditions comprising impregnating said cellulose with an aqueous solution of a salt of a polyamine free of hydroxyl groups and a hydroxy monocarboxylic acid and drying said impregnated cellulose, said cellulose being impregnated with a sufficient amount of said solution that the dried impregnated cellulose contains from about 2–50% by weight of said salt.

8. The process of claim 7 in which said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

9. The process of dimensionally stabilizing cellulose subject to varying humidity conditions comprising impregnating said cellulose with an aqueous solution of a salt of a polyamine free of hydroxyl groups and a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and drying said impregnated cellulose, said cellulose being impregnated with a sufficient amount of said solution that the dried impregnated cellulose contains from about 2–50% by weight of said salt.

10. The process of claim 9 in which said aqueous solution also contains a sufficient amount of a water-soluble thermosetting resin selected from the group consisting of a urea-formaldehyde resin, a melamine-formaldehyde resin, and a phenol-formaldehyde resin that the resulting dried impregnated cellulose will contain from about 5–50% by weight of said thermosetting resin.

11. An article of manufacture comprising cellulose impregnated with from 2–50% by weight of a salt of a polyamine free of hydroxyl groups and an organic compound having a plurality of hydroxyl groups attached to different carbon atoms in the molecule, at least one of the hydroxyl groups being part of a carboxyl group, said organic compound being selected from the group consisting of a polycarboxylic acid, a hydroxy monocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

12. An article of manufacture as defined in claim 11 wherein said cellulose is also impregnated with from about 5–50% by weight of a thermosetting resin selected from the group consisting of a urea-formaldehyde resin, a melamine-formaldehyde resin, and a phenol-formaldehyde resin.

13. An article of manufacture comprising cellulose impregnated with from 2–50% by weight of a salt of a polyamine free of hydroxyl groups and a polycarboxylic acid.

14. An article of manufacture as defined in claim 13 wherein said cellulose is also impregnated with from about 5–50% by weight of a thermosetting resin selected from the group consisting of a urea-formaldehyde resin, a melamine-formaldehyde resin, and a phenol-formaldehyde resin.

15. An article of manufacture comprising cellulose impregnated with from 2–50% by weight of a salt of a polyamine free of hydroxyl groups and a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

16. An article of manufacture as defined in claim 15 wherein said cellulose is also impregnated with from about 5–50% by weight of a thermosetting resin selected from the group consisting of a urea-formaldehyde resin, a melamine-formaldehyde resin and a phenol-formaldehyde resin.

17. An article of manufacture comprising cellulose impregnated with from 2–50% by weight of a salt of a polyamine free of hydroxyl groups and a hydroxy monocarboxylic acid.

18. An article of manufacture as defined in claim 17 wherein said cellulose is also impregnated with from about 5–50% by weight of a thermosetting resin selected from the group consisting of a urea-formaldehyde resin, a melamine-formaldehyde resin and a phenol-formaldehyde resin.

19. An article of manufacture comprising cellulose impregnated with from 2–50% by weight of a salt of a polyamine free of hydroxyl groups and a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid.

20. An article of manufacture as defined in claim 19 wherein said cellulose is also impregnated with from about 5–50% by weight of a thermosetting resin selected from the group consisting of a urea-formaldehyde resin, a melamine-formaldehyde resin and a phenol-formaldehyde resin.

21. A composition of matter comprising an aqueous solution of a water-soluble thermosetting resin selected from the group consisting of a urea-formaldehyde resin, a melamine-formaldehyde resin and a phenol-formaldehyde resin and a salt of a polyamine free of hydroxyl groups and an organic compound having a plurality of hydroxyl groups attached to different carbon atoms in the molecule, at least one of the hydroxyl groups being part of a carboxyl group, said organic compound being selected from the group consisting of a polycarboxylic acid, a hydroxy monocarboxylic acid, a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid, and a partial ester of a polyhydric alcohol and a polycarboxylic acid, said last-mentioned ester containing only one polyhydric alcohol residue and at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

22. A composition of matter comprising an aqueous solution of a water-soluble thermosetting resin selected from the group consisting of a urea-formaldehyde resin, a melamine-formaldehyde resin and a phenol-formaldehyde resin and a salt of a polyamine free of hydroxyl groups and a polycarboxylic acid.

23. A composition of matter comprising an aqueous solution of a salt of a polyamine free of hydroxyl groups and a partial ester of a polyhydric alcohol and a polycarboxylic acid, said ester containing only one polyhydric alcohol residue and at least two polycarboxylic acid residues and said ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

24. A composition of matter comprising an aqueous solution of a water-soluble thermosetting resin selected from the group consisting of a urea-formaldehyde resin, a melamine-formaldehyde resin and a phenol-formaldehyde resin and a salt of a polyamine free of hydroxyl groups and a partial ester of a polyhydric alcohol and a polycarboxylic acid, said ester containing only one polyhydric alcohol residue and at least two polycarboxylic acid residues and acid ester containing at least two hydroxyl groups which are part of a carboxyl group, said ester having been formed by reacting said polycarboxylic acid with said polyhydric alcohol at an elevated temperature in a proportion of at least about two mols of said acid for each mol of said alcohol and stopping said reaction after the acidity has been reduced by a fraction of $1/n$ where $n$ is the number of carboxyl groups in the said polycarboxylic acid.

25. A composition of matter comprising an aqueous solution of a water-soluble thermosetting resin selected from the group consisting of a urea-formaldehyde resin, a melamine-formaldehyde resin and a phenol-formaldehyde resin and a salt of a polyamine free of hydroxyl groups and a hydroxy monocarboxylic acid.

26. A composition of matter comprising an aqueous solution of a salt of a polyamine free of hydroxyl groups and a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid.

27. A composition of matter comprising an aqueous solution of a water-soluble thermosetting resin selected from the group consisting of a urea-formaldehyde resin, a melamine-formaldehyde resin and a phenol-formaldehyde resin and a salt of a polyamine free of hydroxyl groups and a partial ester of a polyhydric alcohol and a polycarboxylic acid, said ester containing only one polyhydric alcohol residue and only one polycarboxylic acid residue, said ester containing at least one free hydroxyl group and at least one hydroxyl group which is part of a carboxyl group, said ester having been formed by reacting said polyhydric alcohol and said polycarboxylic acid in substantially equimolecular proportion at an elevated temperature and stopping said reaction after the acidity has been reduced by a fraction of $1/n$ where $n$ is the number of carboxyl groups in the said polycarboxylic acid.

References Cited in the file of this patent

UNITED STATES PATENTS

| 2,288,413 | Mayan | Aug. 2, 1938 |
| 2,629,701 | Ericks | May 27, 1949 |
| 2,728,737 | Whitcoff | Dec. 27, 1955 |
| 2,768,090 | Whitcoff et al. | Oct. 23, 1956 |

OTHER REFERENCES

F. B. Speyer: "Polyamide Resin Suspensoids," Paint, Oil & Chemical Review (Jan. 3, 1952), pp. 7, 8, 10, 11, 30, and 31.